United States Patent [19]

Zulaski

[11] 4,104,687
[45] Aug. 1, 1978

[54] DEVICE FOR DETECTING UNBALANCED CONDITIONS IN A POLYPHASE EQUIPMENT BANK

[75] Inventor: John A. Zulaski, Mt. Prospect, Ill.
[73] Assignee: S&C Electric Company, Chicago, Ill.
[21] Appl. No.: 744,868
[22] Filed: Nov. 24, 1976
[51] Int. Cl.[2] .............................................. H02H 7/16
[52] U.S. Cl. ...................................... 361/17; 361/15; 361/88
[58] Field of Search ....................... 361/17, 15, 16, 86, 361/88, 91, 107

[56] References Cited

U.S. PATENT DOCUMENTS

| | | | |
|---|---|---|---|
| 2,933,652 | 4/1960 | Cuttino | 361/17 |
| 3,859,564 | 1/1975 | Zulaski | 361/17 |

Primary Examiner—Patrick R. Salce
Attorney, Agent, or Firm—Kirkland & Ellis

[57] ABSTRACT

A sensing device is connected to an intermediate tap point on each phase leg of a polyphase system such as a grounded wye-connected capacitor bank to detect faulted capacitor units and thereby control a switching device to isolate the capacitor bank. The intermediate tap point is selected in each phase leg such that the number of series units (such as parallel capacitor groups) above the tap point equals (or exceeds by one) the number of series units below the tap point. The outputs of these sensing devices are coupled through a calibration network to a summing amplifier which operates to add the three signals vectorily to produce on AC output signal that is filtered by a 60 Hz band pass filter to attenuate unwanted harmonics and noise which might introduce error into the measurement. Initial balance is achieved by adjusting the magnitude of each phase to ground signal to equalize those signals from each of the intermediate tap points. By this adjustment, the output signal of the summing amplifier and filter is then proportional to the percent unbalance among the three intermediate tap point voltages. The percent unbalance output signal is directly related to the change in voltage occurring at the tap point due to faulted capacitor units. When the unbalance persists for a preselected time period, an alarm or a switching device is actuated to isolate and protect the capacitor bank.

25 Claims, 10 Drawing Figures

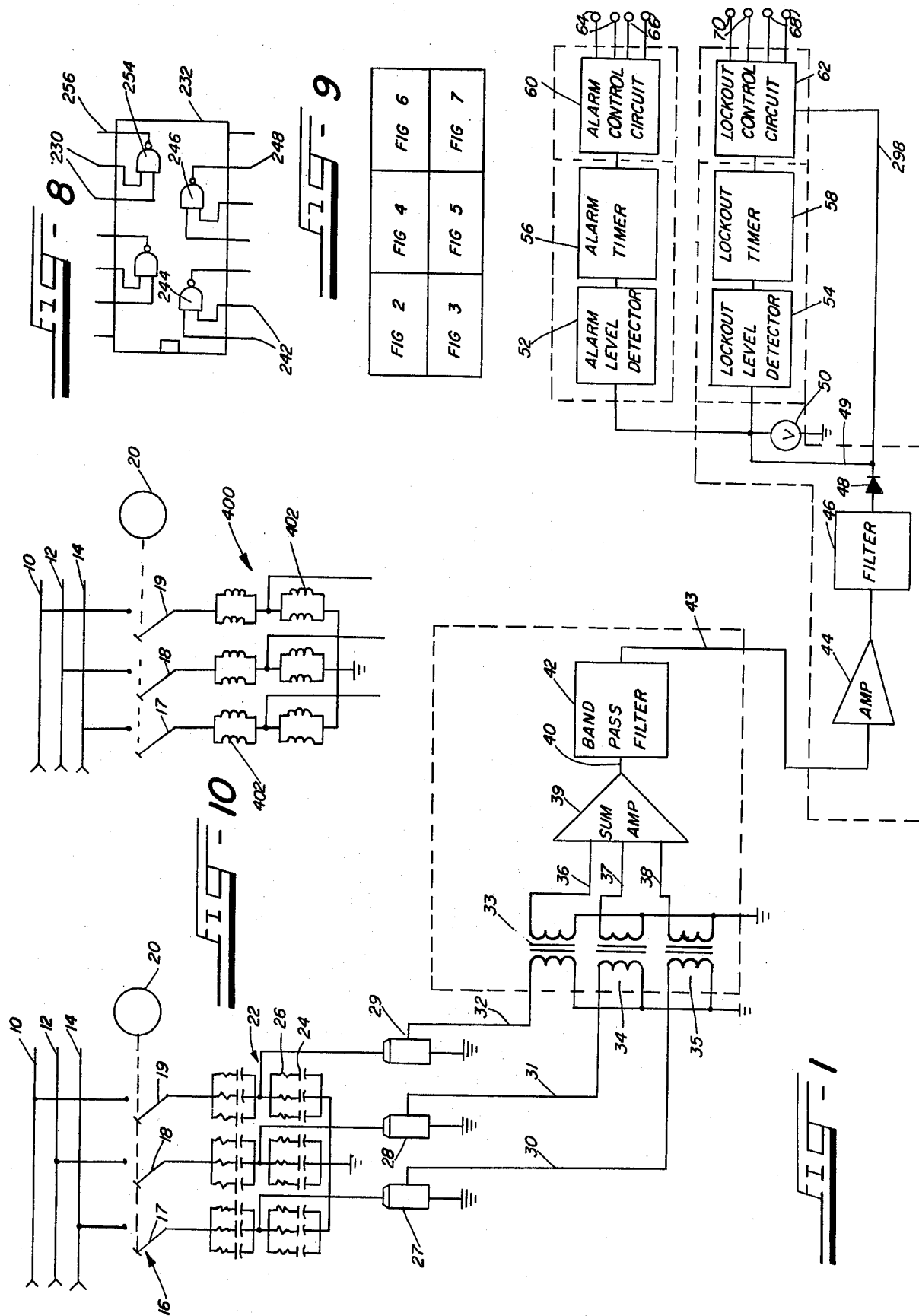

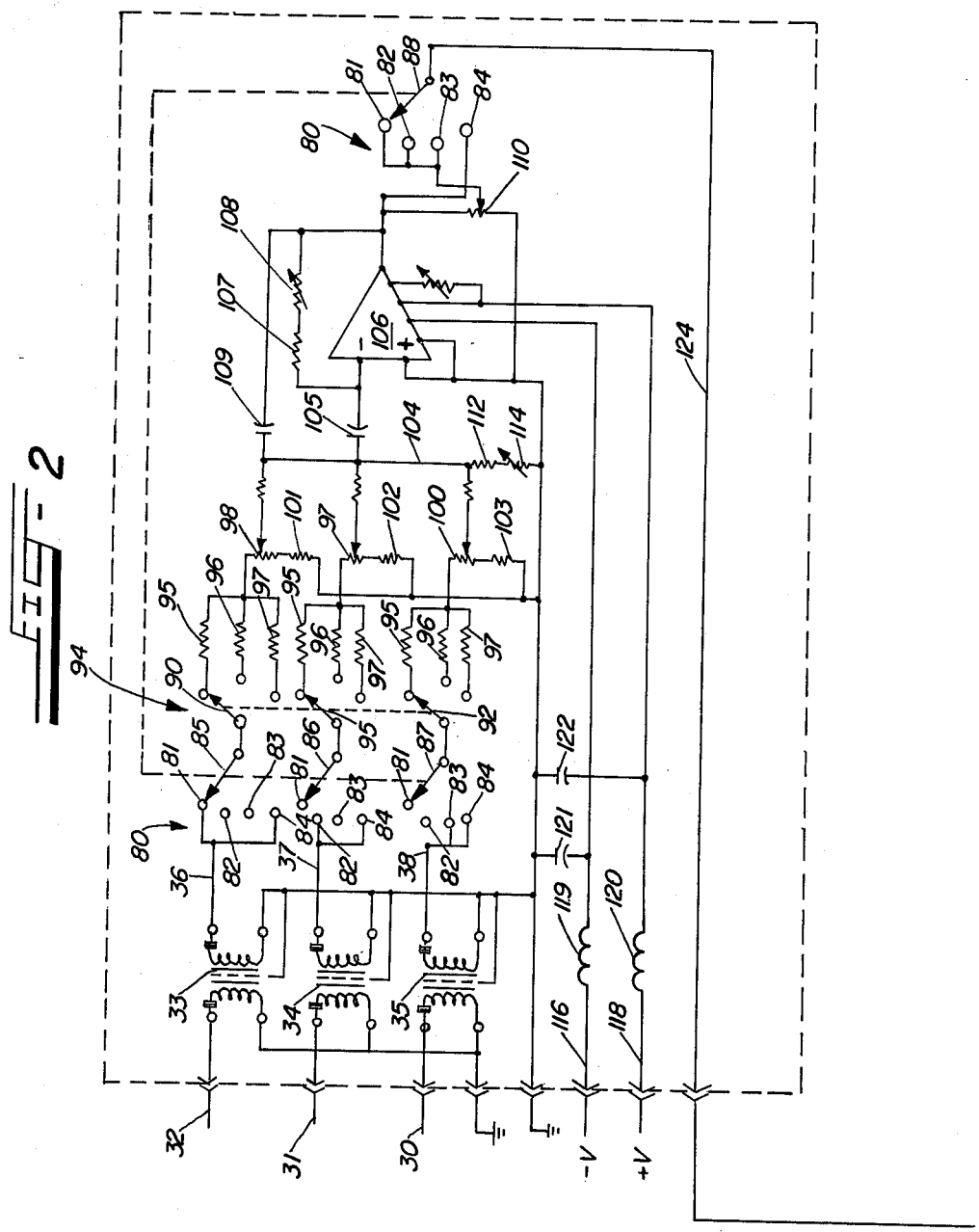

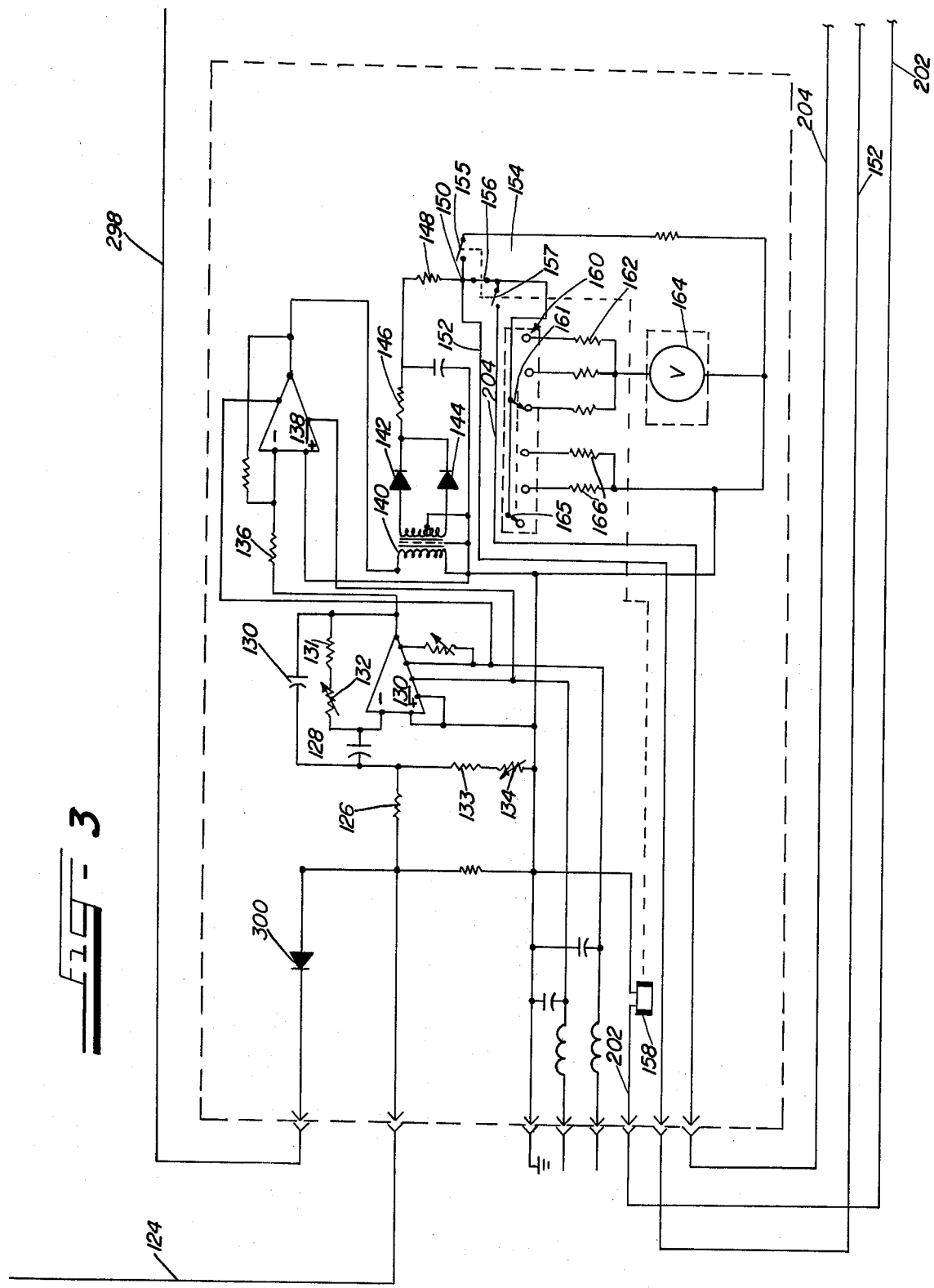

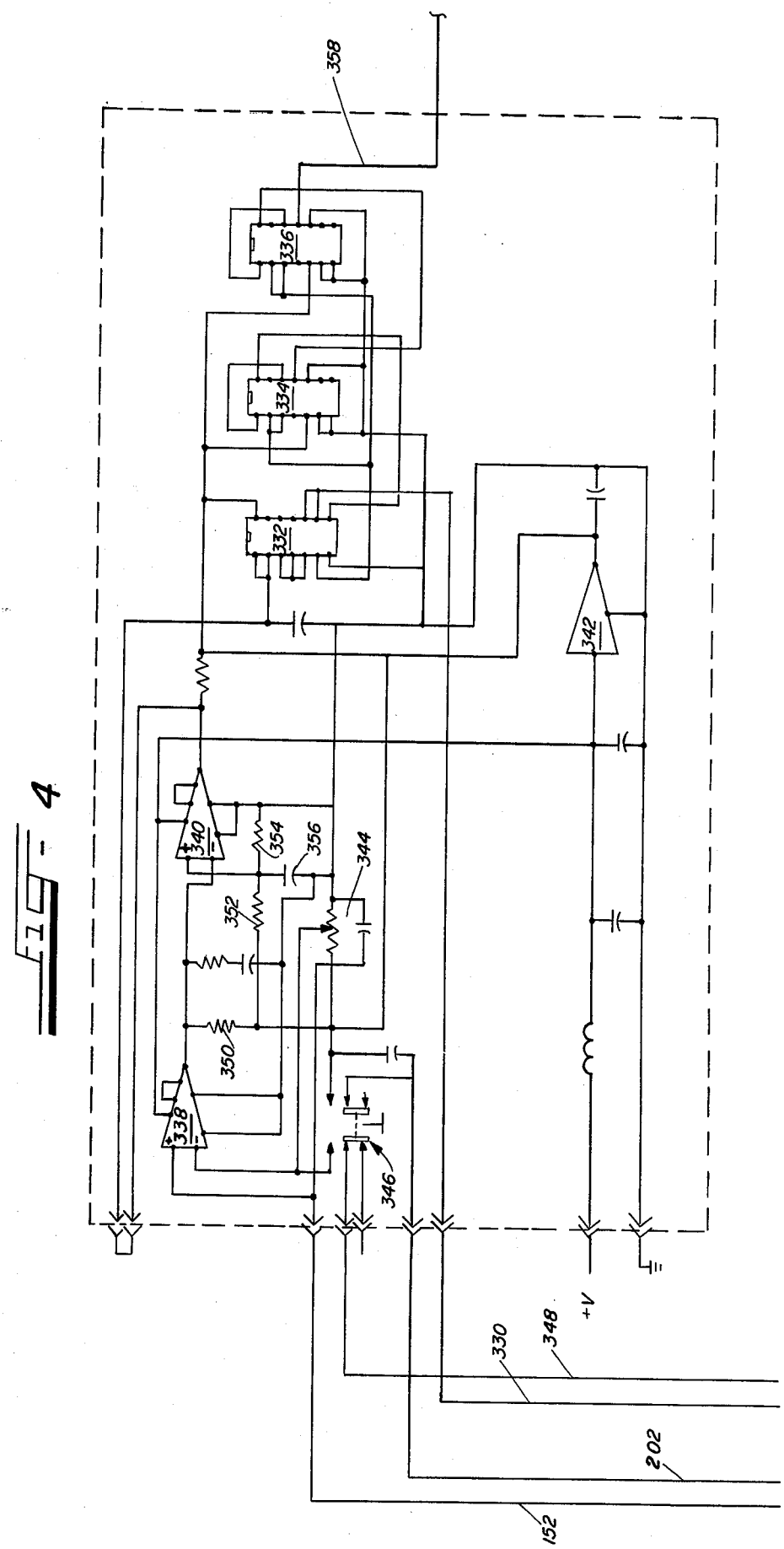

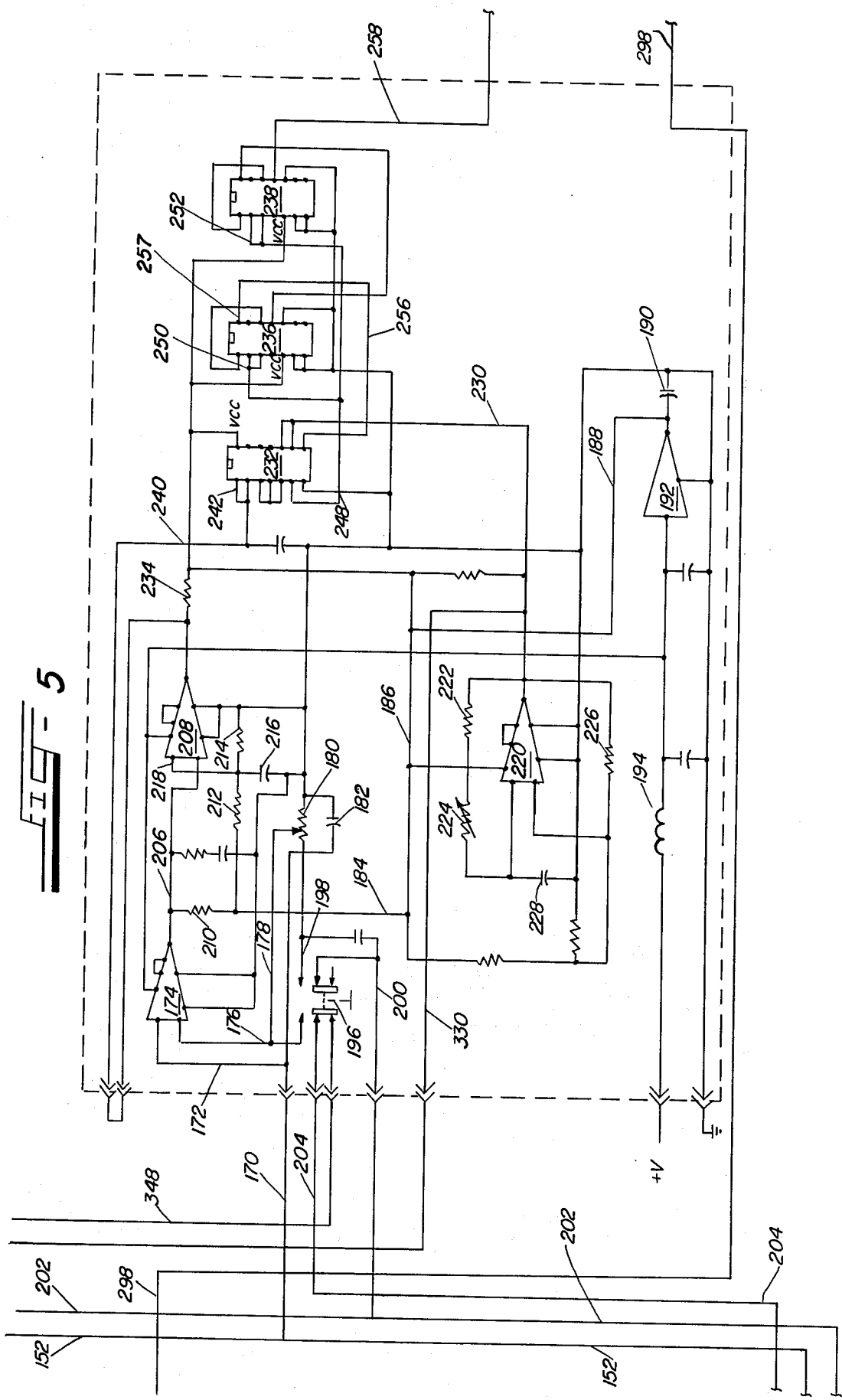

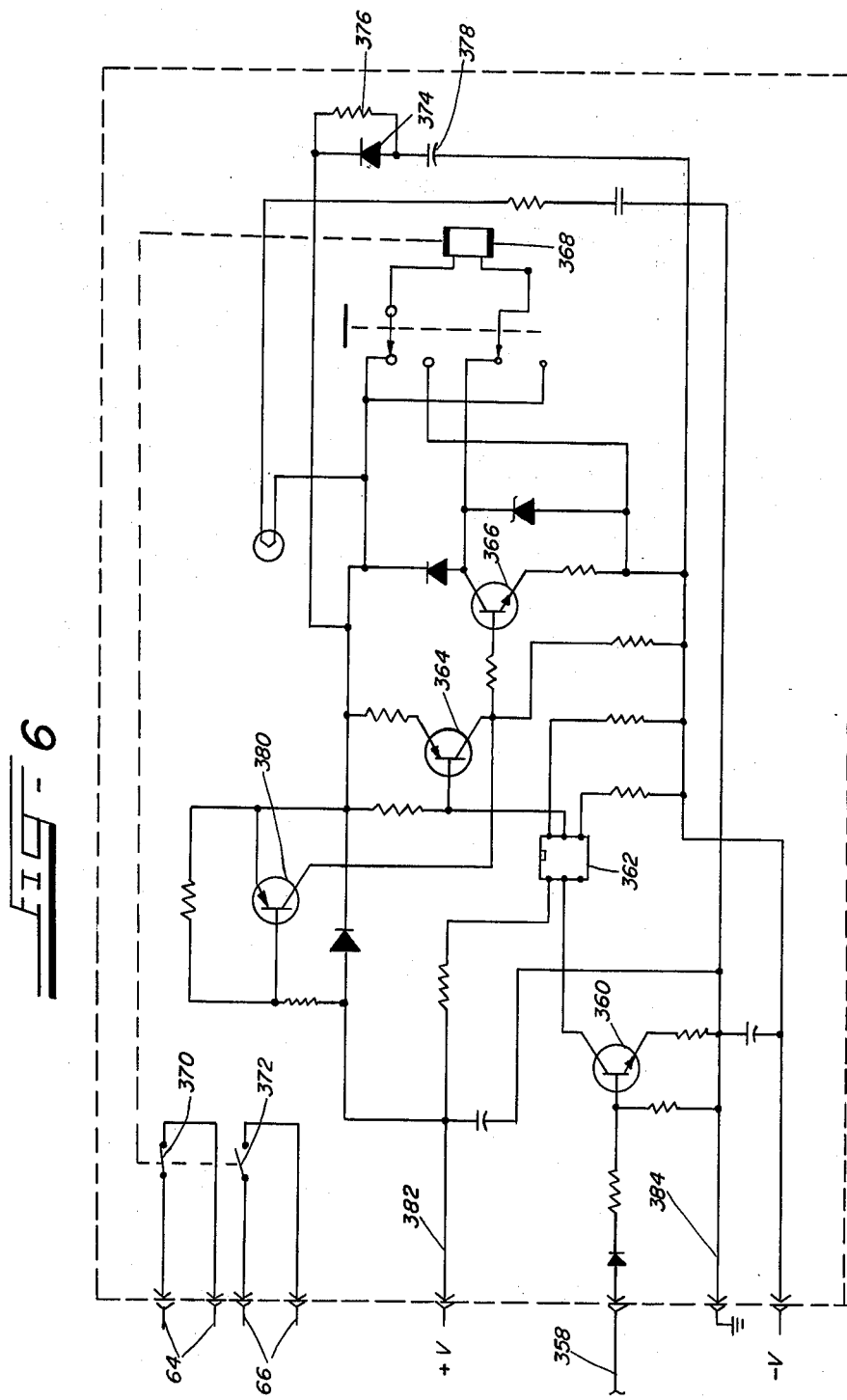

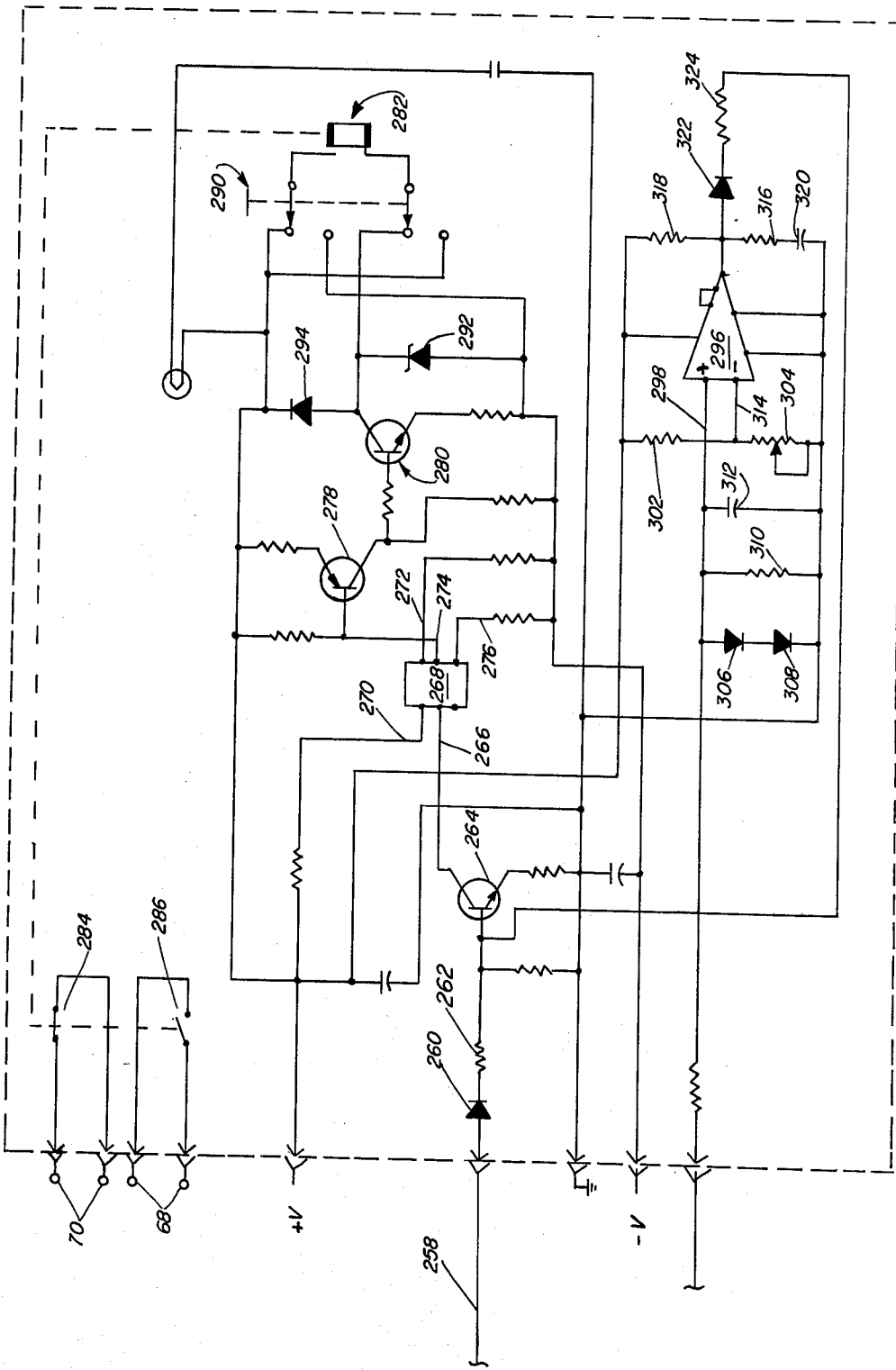

DEVICE FOR DETECTING UNBALANCED CONDITIONS IN A POLYPHASE EQUIPMENT BANK

BACKGROUND OF THE INVENTION

1. Field of the Invention

The present invention relates to devices for detecting unit failures in a polyphase system, and more particularly, to a device for detecting capacitor unit failures in a multi-phase grounded wye-connected capacitor bank in a high voltage transmission system.

2. Description of the Prior Art

Various polyphase systems are used by electrical utilities in high voltage transmission systems. For example, three-phase multi-capacitor wye-connected capacitor banks are used by electrical utilities for power factor correction and voltage regulation in three-phase high voltage transmission systems. These capacitor banks are typically made up of three single-phase legs, each leg made up of groups of capacitor units connected in series, where each group consists of one or more individual capacitor units connected in parallel. One side of each leg is connected to one of three transmission lines of the three-phase high voltage transmission system. The opposite side of each leg of the capacitor bank is connected to a ground point. This arrangement is commonly known as a "grounded-wye" capacitor bank. Such capacitor banks are extremely beneficial in maintaining voltage, reducing losses, reducing operating costs, and delaying the need for building additional transmission lines.

However, several problems have been experienced by such capacitor banks, one of which is commonly known as a "cascading" failure. Typically, each capacitor in the bank is individually fused, and the loss of a single capacitor within a series group with the attendant fuse opening increases the impedance of that capacitor group thereby increasing the voltage across the group and increasing the possibility of failure of the remaining capacitors in its particular group. This increased voltage has, in some cases, caused sufficient over-voltage to result in complete failure of the remaining capacitors in the entire phase leg of a three phase bank.

The sensitivity of capacitor units to over-voltage is well known. The operating life of a capacitor is normally very long provided there is no application of voltage over the rated voltage of the capacitor. Typically, over-voltage of more than 110% of the rated voltage of the capacitor unit may cause failure or drastically reduce its life expectancy. Thus, loss of as few as one capacitor in a group of capacitors in a capacitor bank may be sufficient to increase the voltage on the remaining capacitors to a level sufficient to cause successive failures of the other capacitors. It is this "cascading" effect which makes the problem of detecting the loss of an individual capacitor unit important to the overall protection of the capacitor bank.

Many sensing systems and capacitor bank configuration designs have been utilized in an attempt to avoid the cascading effect by sensing the loss of individual capacitor units. One means of protecting grounded wye capacitor banks has been by use of a current transformer to sense the current from the neutral point to ground. However, energization of a grounded wye capacitor bank is unavoidably accompanied by extremely high in-rush currents between the bank neutral and ground, particularly when parallel banks are already energized. Such in-rush currents can be of the magnitude of thousands of amperes thus requiring adequate surge protection of the current transformer itself and the sensing equipment connected to the secondary of the sensing transformer. Adequate surge protection is expensive and difficult to achieve. Further, this scheme usually lacks sufficient sensitivity to provide proper protection since the selection of a suitable current transformer to provide proper sensitivity usually leads to current transformer and/or control equipment damage or nuisance tripping of the capacitor bank during high in-rush currents. To avoid this, a current transformer of a higher ratio is selected which decreases the sensitivity of the protection. Further, this arrangement does not provide for compensation for unbalance due to capacitor unit manufacturing tolerance variations or fixed system voltage unbalance.

Another prior art scheme of the type disclosed in U.S. Pat. No. 3,181,031—Yee uses six potential transformers (two per phase) and an over-voltage relay. For each phase, one potential transformer senses line voltage, the other senses the voltage at an intermediate tap point within each phase leg. However, the tap point normally is selected just ahead of the series group that is nearest to ground potential. With this sensing arrangement, the increased impedance of any series group above the tap point due to loss of capacitor units will not effect the tap point voltage by as large a percentage as the loss of capacitor units below the tap point. Hence, the loss of capacitor units below the tap point may cause nuisance tripping, or alternatively, an unnecessarily large number of capacitor units above the tap point may fail before lockout level is reached.

An additional problem incident to prior art devices utilized to detect failure of one or more capacitors in a capacitor bank has been the inability of the prior art devices to distinguish between the voltage unbalance caused by power system voltage unbalance or by manufacturing tolerance errors in individual capacitors in the capacitor bank. In larger capacitor banks, the unbalance voltages can produce significant errors or even obscure the signal created by the loss of an individual capacitor unit.

Other polyphase equipment banks have component failure detection problems substantially similar to that of high voltage wye capacitor banks. For example, in many high voltage transmission installations, grounded wye reactor banks comprising air core inductor coils are often connected to the transmission lines and interconnected at a common neutral point. Failure of one of the coils of a reactor bank typically results from the shorting across one or more turns of the layers of the coil. Such failure produces voltage unbalance because of the change of the reactance of the coil. Further, failure to detect the shorting of a winding will ultimately result in catastrophic failure of the inductor.

Thus, the reactor bank has the same detection problems present in a capacitor bank. In particular, manufacturing tolerance error and system unbalance can cause error signals to be introduced which will obscure the detection of component failure.

Accordingly, it would be a highly desirable advance in the art to provide an apparatus for detecting failure of one or more components of a polyphase equipment bank.

BRIEF DESCRIPTION OF THE INVENTION

A device in accordance with the present invention for detecting voltage unbalances in a polyphase equipment bank utilized in an electrical power system resulting from failure or inadvertent change of one or more components of the bank comprises voltage sensing means for providing a voltage signal for each phase representative of the voltage between ground and an electrically similar intermediate tap point located between ground and a transmission line for that phase of the power system. An electrically similar tap point is one where the vectoral sum of the tap voltages is normally zero, and typically would be selected at a point where the number of units from ground to the tap point in each leg is equal. A summing means is provided for vectorially adding the voltage signals from each phase and producing an output AC signal representative of the summation of the voltage signals for each phase. Rectifier means is provided for converting the AC signal from the summing means to a corresponding DC voltage signal. The DC voltage signal is applied to a first comparator means which compares the DC voltage signal to a pre-determined first reference voltage and produces a first output signal when the DC voltage signal is equal to or exceeds the first reference voltage. A first timer means is provided for timing the duration of the first output signal from the first comparator means and producing a first control signal when the duration exceeds a predetermined first time interval. A first control means is provided for disconnecting the polyphase equipment bank from the electrical power system in response to receipt of a control signal.

The device may also comprise a second comparator means for comparing the DC voltage signal to a predetermined second reference voltage and producing an output signal when the DC voltage signal is equal to or exceeds the second reference voltage. Second timer means is provided for timing the duration of the output signal from the second comparator means and producing a second control signal when the duration exceeds a predetermined second time interval. A second control means is provided for providing a visual or audible alarm signal in response to receipt of a second control signal.

The device may also include a third comparator means for comparing the DC voltage signal to a predetermined third reference voltage representative of a gross over-voltage unbalance of the polyphase system and producing an output signal directly to the first control means when the DC voltage signal is equal to or exceeds the third reference voltage so that the first control means will quickly disconnect the polyphase bank from the electrical power system without awaiting operation of the first timer means.

A calibration means may also be provided for compensating for manufacturing tolerance errors of the components of the polyphase bank and fixed unbalances in the electrical power system. The calibration means includes switch means for selectively and individually connecting each phase voltage signal to the summing amplifier means and for dividing the output AC signal of the summing amplifier means by preselected ratio before it is applied to a meter. Also provided is means for individually adjusting the magnitude of the voltage signal from the voltage sensing means for each phase applied to the summing amplifier means so that the magnitude of the output AC signal of the summing amplifier means for each phase can be adjusted to be equal.

The summing means can further comprise a filter means for filtering out unwanted harmonics and noise from the output AC signal. Also, means may be provided for adjusting the first and second reference voltages to a desired level. In addition, a coarse adjustment may be provided for proportionally adjusting the voltage signals from the voltage sensing means so that the voltage signals are of an amplitude when applied to the summing means to provide for optimum operation of the device. Further, the second control means can also include a power sensing means which causes an alarm signal to be produced when electrical power to the device is terminated so that the operator knows when the device is inoperative.

Thus, it is a primary object of the present invention to provide a device for detecting unbalances in a polyphase system which will sense the failure of one or more components of the polyphase system.

Yet another object of the present invention is to provide a device for detecting voltage unbalances in a polyphase equipment bank which eliminates error signals resulting from manufacturing tolerance errors of the components of the polyphase system as well as power system unbalances.

Yet another object of the present invention is to provide a device for detecting voltage unbalances of a polyphase system resulting from failure or inadvertent change of one of the components of the polyphase system that permits adjustment and calibration without the need for external test equipment.

It is another object of the present invention to provide a device for detecting voltage unbalances in a polyphase system resulting from failure or inadvertent change of one or more components of the polyphase system that prevents unwanted operation resulting from circuit disturbances and noise but permits rapid operation in the event of a massive failure of the components of the system.

These and other objects, advantages, and features of the present invention shall hereinafter appear, and for the purposes of illustration, but not for limitation, an exemplary embodiment of the present invention is illustrated in the accompanying drawings.

BRIEF DESCRIPTION OF THE DRAWINGS

FIG. 1 is a block diagram of a preferred embodiment of the present invention connected to a grounded wye capacitor bank.

FIG. 2 is a detailed circuit diagram of the summing amplifier and filter circuit of the present invention.

FIG. 3 is a detailed circuit diagram of the voltmeter circuit of the present invention.

FIG. 4 is a detailed circuit diagram of the alarm level detector and timer circuit of the present invention.

FIG. 5 is a detailed circuit diagram of the lockout level detector and timer circuit of the present invention.

FIG. 6 is detailed circuit diagram of the alarm control circuit of the present invention.

FIG. 7 is a detailed circuit diagram of the lockout control circuit of the present invention.

FIG. 8 is a circuit diagram of the NOR gate configuration of certain integrated circuits used in the present invention.

FIG. 9 is a diagram showing the arrangement of FIGS. 2 – 7.

FIG. 10 is a diagram of a reactor bank polyphase system in which the present invention could be utilized.

DETAILED DESCRIPTION OF THE PREFERRED EMBODIMENT

With reference to FIG. 1, three high voltage transmission lines 10, 12, and 14 are shown as representative of a typical three phase high voltage transmission system. Connected to the transmission lines is a disconnect switch arrangement 16 having switch contacts 17, 18, and 19 controlled by a conventional switch operator 20 (graphically illustrated as a circle) that operates to open or close contacts 17, 18, and 19 when controlled by an appropriate control signal. Contacts 17, 18, and 19 are connected to a polyphase equipment bank comprising grounded wye-connected capacitor bank 22 that comprises a plurality of parallel combinations of individual capacitors 24 and series fuses 26. While grounded wye-connected capacitor bank 22 is depicted as comprising two series groups of three parallel capacitors for each phase leg, it should be understood that capacitor bank 22 could comprise any number of capacitors grouped in various parallel and serial combinations. Each of the three phases of the capacitor bank are grounded to a common ground to comprise a typical grounded wye arrangement. Respectively connected to a central tap point of each phase leg of the capacitor bank 22 are three potential devices 27, 28, and 29 which respectively measure the phase to ground voltage at each of the three electrically similar tap points. The electrically similar tap points are selected to be at an intermediate point such that the number of series capacitor groups above the tap point equals (or exceeds by no more than one) the number of series capacitor groups below the tap point.

The potential devices 27, 28, and 29 may be any of a variety of potential devices including resistance devices, potential transformers, or capacitance voltage dividers capable of producing on output leads 30, 31, and 32 a voltage representative of the voltage at the individual phase leg tap points. Leads 30, 31 and 32 are respectively connected to the primary winding of isolation transformers 33, 34, and 35. The secondary winding of transformers 33, 34, and 35 are connected by leads 36, 37, and 38 to summing amplifier 39. Summing amplifier 39 operates to add vectorily the three output signals from potential devices 27, 28, and 29 to provide an output on line 40 to band pass filter 42 representative of the summation of the voltages at the three tap points. This summation represents the voltage percent unbalance resulting from failure of one or more of the capacitors. Band pass filter 42 is a narrow 60 hertz band pass filter used to attenuate unwanted harmonics and noise which might introduce error in the measurement.

Initial balance of the system is achieved by adjusting the magnitude of each of the phase to ground signals derived from the intermediate tap point potential devices 27, 28, and 29 until they are equal in a manner that will be more fully described hereinafter. Thus, an null is created or synthetic neutral at the summing amplifier and filter output to eliminate unbalances resulting from capacitor tolerances and power system unbalances. Through proper calibration, the output signal of the band pass filter 42 (which is normally zero) is proportional to the percent unbalance among the three intermediate tap point voltages which is directly related to the change in voltage occurring at the tap points when any of the capacitor units 24 fail.

The output of the band pass filter 42 is applied on lead 43 to an amplifier 44, filter 46 and a rectifier 48 which converts the AC percent unbalance signal to a proportionate DC voltage on lead 49. A DC volt meter 50 is used to read this DC voltage level and is calibrated to read the capacitor bank tap voltage percent unbalance due to loss of individual capacitor units. The converted DC voltage level is also fed to an alarm level detector 52 and a lockout level detector 54. Both level detectors 52 and 54 are designed to compare the DC voltage representative of the percent unbalance signal with a predetermined reference voltage and provide respectively to alarm timer 56 and lockout timer 58 a signal when the percent unbalance signal exceeds the predetermined reference voltage. The level detectors 52 and 54 have adjustable reference level setting means which can adjust the reference voltage to a selected level. This level setting means can be preset so that the level detectors provide a signal when the tap-voltage percent unbalance attains a corresponding level such that the voltage across surviving capacitor units in a series group exceeds the recommended working voltage.

Timing circuits 56 and 58 are provided to avoid false operation due to transient voltages caused by bank switching or system disturbances. The output signal from the alarm detector 52 and the lockout level detector 54 must persist for a selectable period of from, for example, 4–30 seconds before timers 56 and 58 provide an output signal. When a tap voltage percent unbalance persists above the preselected level for the preselected time period, a signal is provided respectively to the alarm control circuit 60 and the lockout control circuit 62. The alarm control circuit 60 provides an output on output terminals 64 and 66 which can operate an alarm as a buzzer or bell.

The lockout control circuit 62 provides an output terminals 68 which causes switch operator 20 to operate to open switch contacts 17, 18, and 19 to disconnect the capacitor bank 22 from the circuit, and on output terminal 70 which causes switch operator 20 to close contact 17, 18, and 19 to connect the capacitor bank into the circuit. In addition, lockout control circuit 62 contains a "gross over voltage" circuit (described more fully below) which functionally bypasses the lockout detector 54 and lockout timer 58 to achieve fast operation of switch operator 20 to isolate the capacitor bank 22 in the event of a massive fault within the capacitor bank when an excessive tap voltage percent unbalance is applied on input lead 298. Typically, this circuit is actuated whenever the percent unbalance exceeds a predetermined level such as 12½%.

The present invention overcomes the deficiencies of the prior art systems. The prior art neutral current transformer which is susceptible to damage by high in-rush current characteristics of grounded capacitor bank switching is eliminated. Sensitivity is improved by using the summed intermediate tap point approach, by using highly precise and environmentally stable solid state components for level detection and filtering, and by introducing a fixed minimum time delay to avoid nuisance operations created by transient conditions. The error voltages appearing at the intermediate tap points caused by inherent capacitor bank unbalance resulting from manufacturing-tolerance variation among capacitor units in the bank or by fixed systems unbalance are compensated by calibration.

With reference to FIG. 2, a more detailed circuit diagram illustrating the isolation transformers, summing amplifier, and band pass filter circuits. Signals from potential devices 27, 28, and 29 are fed into transformers 33, 34, and 35 on input leads 30, 31, and 32. The secondary windings of transformers 33, 34, and 35 are connected to a ganged four position switching arrangement 80 having contacts 81, 82, 83 and 84 and contact arms 85, 86, 87, and 88. Switching managment 80 is used to calibrate the system in a manner to be hereinafter described. Contact arms 85, 86, and 87 are respectively connected to contact arms 90, 91, and 92 of a ganged three-position switch arrangement 94 which provides for coarse adjustment of input levels from potential devices 27, 28 and 29. Contact arms 90, 91, and 92 may be switched between three contact points respectively connected to coarse adjusting resistors 95, 96, and 97 for each of the three phases of the input. Switch arrangement 94 can be switched between the three contact points to provide a coarse voltage adjustment to compensate for the voltage input levels from the potential devices 27, 28, and 29 to provide an optimum operating voltage level. Each of the groups of resistors 95, 96, and 97 for each phase are respectively connected to variable resistors 98, 99, and 100, each of which is respectively connected through a resistor 101, 102, 103 each of equal value, to ground. Each of the wiper arms of variable resistors 98, 99, and 100 are connected in parallel through a series resistor to a common buss 104 which is connected through a capacitor 105 to the input of an integrated circuit summing amplifier 106 which is a commercially available integrated circuit sold under the designation Z01514. Capacitors 105 and 109, resistors 107, 108, 112, and variable resistor 114 make up band pass filter 42 which operates to attenuate unwanted harmonics and noise which might introduce error into the measurement. The output of amplifier 106 is connected to contact 84 of switching arrangement 80 and also to variable resistor 110 which is serially connected to ground. Input leads 116 and 118 provide positive and negative voltage from a power supply (not shown) to the circuit. Chokes 119 and 120 and capacitors 121 and 122 provide voltage filtering.

Contact arm 88 of switching arrangement 80 is connected to lead 124 which is connected through a resistor 126 and capacitor 128 to the input of an integrated circuit amplifier 130 (see FIG. 3). Amplifier 130 is a commercially available integrated circuit sold under the designation Z01514. Capacitor 128, 130 and resistors 131, 132, and 134 all make up a further filter to filter and attenuate unwanted harmonics and noise which might introduce error into the measurement.

The output of amplifier 130 is connected through resistor 136 to the input of an integrated circuit amplifier 138 which operates as a gain of one power amplifier. Amplifier 138 is also a commercially available integrated circuit sold under the designation LM307H. The output of amplifier 138 is connected to the primary winding of a transformer 140, the other side of which primary is connected to ground. The secondary winding of transformer 140 is connected to diodes 142 and 144 and the center tap of the secondary is connected to ground so that the secondary output of transformer is rectified by diodes 142 and 144 to provide a DC voltage that is representative of the AC voltage signal provided by summing amplifier 106. The anodes of diodes 142 and 144 are connected through resistors 146 and 148 to a common point 150. Point 150 is connected to an output lead 152 and to two contacts of a relay controlled switching arrangement 154 which comprises switch arms 155, 156, and 157 all of which are controlled by a relay coil 158. Contact arm 156 is normally closed and connects common point 150 to the contact arms 161 and 165 of meter calibration switch 160. One contact arm 161 of switch 160 is arranged to contact three contacts connected to three calibrating resistors 162 which are connected in parallel to a volt meter 164. The other contact arm 165 is arranged to connect either an open contact or contacts connected to two resistors 166 which are connected to ground for calibration purposes.

To calibrate the input on leads 30, 31 and 32 to compensate for error voltages occuring at the intermediate tap points caused by inherent capacitor bank inbalance resulting from manufacture tolerance variations among capacitor units in the bank as well as error voltage caused by fixed system voltage unbalance, switch arrangement 80 is first switched to the position illustrated in FIG. 2 so that contact arms 85–88 engage contacts 81. In this position, it can be seen that only the voltage input on lead 32 (see FIG. 2) is coupled through to the summing amplifier 106. Variable resistor 110 has been previously adjusted to divide the output of amplifier 106 so that 10% of the output voltage is applied through contact arm 88 and lead 124 to the meter circuit illustrated in FIG. 3. The volt meter 164 is calibrated by the appropriate switching of switch 160 so that a full deflection of the meter represents a 10% voltage unbalance. Variable resistor 98 is then adjusted to provide full meter deflection, i.e., so that a 10% voltage unbalance produces a full meter deflection. Switch 80 is then switched to contacts 82 so that only the voltage input on lead 31 (see FIG. 2) is applied to summing amplifier 106. Variable resistor 97 is then adjusted for full meter deflection as previously described. Switch 80 is then switched to contacts 83 so that only the voltage on lead 30 (see FIG. 2) is applied to amplifier 106. Variable resistor 100 is then adjusted for full meter deflection as previously described. Switch 80 is then switched to contacts 84 so that all three phases on leads 30, 31, and 32 are coupled to the summing amplifier 106 and the output is directly applied to the volt meter 164. The meter will then read zero voltage at the output of the amplifier 106 since all three phases have been balanced by the foregoing calibration. Only after there has been a failure of one or more of the capacitors in capacitor bank 22 will there be a voltage unbalance produced at the output of amplifier 106 which will be registered on the volt meter 164. The advantage of this method of calibration is that no external test equipment is required for calibration. The device provides all of the signals required for calibration.

As previously described, switch 90 provides coarse adjustment to adjust the outputs of the potential devices, 27, 28, and 29 so that an optimum voltage is provided to the summing amplifier 106 for optimum operation. About 120 volts is desired for optimum operation and switch 90 permits some coarse adjustment if the step down ratio of the potential devices 27, 28, and 29 produces voltages outside the optimum voltage range.

With reference to FIG. 3, the voltage balance produced by the summing amplifier 106 is, as previously described, rectified and applied at point 150. Point 150 is connected to lead 152 which extends to FIGS. 4 and 5.

With reference to FIG. 5, lead 152 is connected by leads 170 and 172 to the input of an integrated circuit voltage comparator 174 which is a commercially available integrated circuit sold under the designation LM311H. The other reference input of comparator 174 is connected by leads 176 and 178 to the wiper arm of a variable resistor 180. Lead 170 is also connected to a capacitor 182 across variable resistor 180 for the purpose of noise suppression. One side of variable resistor 180 is connected by leads 184, 186, and 188 to the output of an integrated circuit voltage regulator 192 which provides a regulated 5 volt output. The other side of variable resistor 180 is connected to ground. The input of voltage regulator 192 is connected to a power supply (not shown) through a choke 194.

By adjusting the wiper arm on variable resistor 180, a predetermined reference voltage can be established for comparator 174. Comparator 174 operates to produce a voltage output when the voltage on lead 172 is equal to or exceeds the input reference voltage on lead 176.

To determine the reference voltage on lead 176, switch 196 may be actuated so that the switch contacts engage the upper two pairs of switch contacts illustrated in FIG. 5. This connects lead 198 to lead 200 which is connected to lead 202. Lead 202 is connected back to the relay coil 158 in FIG. 3. Since there is 5 volts on lead 193, relay coil 158 operates relay switch 154 closing contacts 157 and 155, and opening contact 156. The operation of switch 196 also connects the voltage on lead 176 to lead 204 back to FIG. 3 and through contact 157 to the volt meter 164. In this position, the voltage on lead 176 to comparator 174 can be directly read by the volt meter 164 so that the reference voltage on comparator 174 can be directly ascertained.

As previously pointed out, when the voltage on lead 172 is equal to or exceeds the voltage on lead 176, comparator 174 produces an output on lead 206 to the reference voltage input of an integrated circuit comparator 208. Resistors 210, 212, and 214, and capacitor 216 make up an RC circuit which is charged by the output of comparator 174 so that a charging time delay is created such that it takes a predetermined length of time for the voltage on input lead 218 to comparator 208 to reach the same voltage as the output voltage on lead 206. Thus, comparator 208 will not operate to produce an output until the voltage on lead 208 is equal to the voltage on lead 206 thereby providing a predetermined time delay. This time delay is provided so that circuit noise of short duration will not cause the counters (to be described later) to commence operation as a result of such noise.

An integrated circuit comparator 220 is connected in such a way by resistor 222, variable resistor 224, resistor 226, and capacitor 228 to operate as a free running oscillator. The output of oscillator 220 is connected on lead 230 to two inputs leads of integrated circuit 232. With reference to FIG. 8, it can be seen that integrated circuit 232 comprises a group of four NAND gates as illustrated. The output of comparator 208 is connected through a resistor 234 to the V$_{cc}$ inputs of integrated circuit 232 and integrated circuit decade counters 236 and 238. Decade counters 232 and 238 are integrated circuit decade counters sold under the designation 7490. The output of comparator 208 is also connected through lead 240 to both inputs 242 of NAND gate 244 (see FIG. 8) of integrated circuit 232. NAND gate 244 acts as an inverter and feeds the inverted signal to both inputs of NAND gate 246 which again inverts the output on lead 248. Lead 248 is connected to the reset inputs 250 and 252 of decade counters 236 and 238 respectively. Decade counters 236 and 238 are normally held in reset by zero logic on reset terminals 250 and 252, but when an output is produced by comparator 208, it can be seen that the reset terminals 250 and 252 go to a positive logic taking decade counters 236 and 238 out of reset. The output of free running oscillator 220 on lead 230 is similarly fed through a NAND gate 254 in integrated circuit 232 and the inverted output is connected on lead 256 to a clock input 257 of decade counter 236. Decade counters 236 and 238 count the oscillation timing pulses from oscillator 220, and by adjusting variable resistor 224 to vary the speed of oscillations of oscillator 220, decade counters 236 and 238 can be adjusted to provide a time delay interval from approximately 4 seconds to approximately 30 seconds after an output voltage is produced by comparator 208. Typically, the time delay interval is set at approximately 20 seconds. After the preselected time delay interval, and decade counters 236 and 238 have counted to the end of their count, an output signal is produced on lead 258 to FIG. 7.

With reference to FIG. 7, lead 258 is connected through a diode 260 and resistor 262 to the base of transistor 264. An output voltage signal on lead 252 causes transistor 264 to turn "on". The collector of transitor 264 is connected to terminal 266 of an integrated circuit opto isolator 268, commercially available under the designation MCA2-55. Opto isolator 268 comprises a light emitting diode connected across terminals 266 and 270 and a light sensitive NPN transistor, the base of which is connected to lead 272, the collector of which is connected to lead 274, and the emitter of which is connected to lead 276. The collector lead 274 is connected to the base of transistor 278 so that when transistor 264 turns "on" the opto isolator 268 causes transistor 278 to turn "on". The collector of transistor 278 is connected to the base of transistor 280, and when transistor 278 turns "on" a transistor 280 turns "on". This causes current to flow through relay coil 282, which causes the operation of relay switches 284 and 286. When relay coil 282 operates, switch 286 connects contacts 68 so that switch operator 20 (see FIG. 1) opens switch contacts 17, 18 and 19 disconnecting the capacitor bank 22 from the circuit. Relay coil 282 is a latching type relay coil and will remain in the operated position even after transistor 280 turns "off". To cause the switch contact 17, 18 and 19 to close, switch 290 must be manually operated to reverse the voltage on coil 282 causing coil 282 to return switches 284 and 286 to the position illustrated in FIG. 7. This causes switch operator to close contacts 17, 18 and 19 thereby placing the capacitor bank 22 back in the circuit. Zener diode 292 is provided for surge voltage protection, and a diode 294 is provided across coil 282 to reduce back-voltage surges when the field of coil 282 collapses.

Also illustrated in FIG. 7 is a gross over voltage circuit which comprises integrated circuit comparator 296 which is a commercially available integrated circuit sold under the designation LM311H. One input to comparator 296 on lead 298 is connected back through FIG. 5 to FIG. 3. Lead 298 is connected through diode 300 to input lead 124 from summing amplifier 106 in the FIG. 2. Thus, the voltage unbalanced produced by amplifier 106 is directly connected through lead 298 to the input of comparator 296. A reference voltage is supplied by the voltage divider network comprising resistor 302 and variable resistor 304. Variable resistor 304 can be adjusted to provide a reference voltage representative of a selected overvoltage, for example, 12½%. Comparator 296 operates to produce an output when the voltage on lead 298 exceeds the voltage on lead 304. Diode 306 and 308 act as a voltage clamp for the RC network comprising resistor 310 and capacitor 312 which act as a filter for the input. When the voltage on lead 298 exceeds the reference voltage on lead 314, comparator 296 produces an output voltage. Resisters 316, 318, and capacitor 320 act as an RC timing circuit so that there is a time delay in the voltage buildup of the output of comparator 196. This time delayed voltage output from comparator 296 is coupled through a diode 322 and a resister 324 to the base of transistor 264 so that when the voltage output of comparator 296 builds up, it turns transistor 264 "on" causing the operation of relay coil 282 as previously described. The RC circuit of resistors 318, 316 and capacitor 320 is provided to prevent spurious and nuisance tripping of the circuit as a result of noise etc. The gross overvoltage circuit is provided so that if a massive fault is experienced in capacitor bank 22, the capacitor bank 22 will be rapidly switched out of the circuit before additional capacitor units fail as a result of cascading failure. As can be seen this circuit bypasses the lockout level detector and timing circuit previously described with respect to FIG. 5.

With reference to FIG. 4, the alarm level detector and time circuit is illustrated. This circuit is very similar to the lockout level detector and time circuit described in FIG. 5. The principal difference is that the counters in FIG. 4 are slaved off of the oscillator 220 in FIG. 5. The alarm level detector is provided as an optional feature so that either a visual or auditory warning can be provided when one or more capacitors fail. This is advantageous when the voltage unbalance is not great enough to warrant removal of the capacitor bank from the circuit, but an alarm is desired so that the failed capacitor may be subsequently replaced during routine maintenance.

As can be seen in FIG. 5, the output of free running oscillator 220 is also connected to a lead 330 which is connected to two inputs of integrated circuit 332 in FIG. 4 which is an integrated circuit NAND gate identical to integrated circuit 232 in FIG. 5. Integrated circuit decade counters 334 and 336 in FIG. 4 are integrated circuit decade counters identical to decade counters 236 and 238 in FIG. 5. Integrated circuit comparators 338 and 340 in FIG. 4 are integrated circuit comparators identical to the comparators 174 and 208 in FIG. 5. Voltage regulator 342 in FIG. 4 is identical to voltage regulator 192 in FIG. 5 and operates to provide a regulated 5 volt output. Variable resistor 344 provides a reference voltage to comparator 338 so that when the voltage on lead 152 exceeds the reference voltage comparator 338 operates to provide an output.

The reference voltage can be visually determined by the operation of switch 346 which connects the reference voltage to lead 348 which is connected to one of the contacts of switch 196 in FIG. 5. As can be seen, switch 196 must be in the position illustrated in FIG. 5 before the voltage on lead 348 is connected to lead 204 which as has previously been pointed out is connected to a meter 164. Thus, the reference voltage for comparator 338 can only be measured on meter 164 when switch 196 is in its unoperated position thereby preventing double operation of switches 196 and 346 which could result in a false reading.

When the voltage on lead 152 exceeds the reference voltage provided by variable resistor 344, comparator 338 operates to provide an output. Resistors 350, 352, 354, and capacitor 356 is a RC time delay circuit so that comparator 340 does not operate for a predetermined period of time in the same manner as previously described with respect to FIG. 5. When comparator 340 does provide an output, that output triggers the operation of the decade counters 334 and 336 in the same manner as previously described with respect to decade counters 236 and 238 in FIG. 5 so that after a predetermined time period, an output is produced on lead 358.

With reference to FIG. 6, the alarm control circuit is illustrated. The alarm control circuit in FIG. 6 is almost identical to the lockout control circuit of FIG. 7 with the principle exception that the gross over-voltage circuit has been eliminated. An input on lead 358 causes transistor 360 to turn "on" causing opto isolator 362 to operate on turn "on" transistors 364 and 366 applying current to relay coil 368 causing switches 370 to operate. Switches 370 and 372 can be connected to various types of alarm circuits such as audible warning devices, lights, etc. which will provide either a visual or auditory warning that one or more of the capacitors in capacitor bank 22 has failed. The alarm device may be used to provide a warning that a capacitor has failed when it is not desired to remove the capacitor bank from the circuit since the failure is not sufficiently serious to cause subsequent failure. Thus, the faulted capacitor can be replaced at some subsequent time during normal maintenance.

Transistor 380 is provided to allow an alarm signal to be produced when there is a loss of supply voltage so that the operator will know that the device is not properly powered. If voltage is lost, capacitor 378 provides sufficient charge to turn transistor 380 "on" which turns "on" transistor 366 causing relay 368 to operate to produce an alarm. However, as long as the power supply voltage is supplied on leads 382 and 384, transistor 380 remains "off". Another difference between the FIG. 6 and FIG. 7 circuits is diode 374 and resistor 376 which limits the charging current to capacitor 378 to limit inrush currents and protect the power supply.

It should be expressly understood that although the present embodiment described herein is described with respect to a grounded wye capacitor bank, the present invention could also be used in connection with reactor banks of the type illustrated in FIG. 10. A reactor bank 400 is illustrated comprising parallel and series combinations of reactor coils 402. The intermediate tap points of the reactor coils could be connected to potential devices 27, 28, and 29 in FIG. 1.

It should also be apparent that various changes, alterations, and modifications of the preferred embodiment illustrated herein could be made without departing from the spirit and scope of the present invention as defined in the appended claims.

I claim:

1. A device for detecting voltage unbalances in a polyphase equipment bank, each phase of the bank being energized by a respective line of an electrical power system, the unbalances resulting from failure or inadvertent change of one or more components of the polyphase equipment bank comprising:

voltage sensing means for providing a voltage signal for each phase of the equipment bank representative of the voltage between ground and an electrically similar tap point located within each phase of the equipment bank;

summing means for vectorily adding the voltage signals for each phase and producing an output AC signal representative of the summation of the voltage signals for all phases;

calibration means for adjusting said voltage signal for each phase of the equipment bank to nullify any manufacturing tolerance errors of components of the equipment bank;

signal processing means for producing a first output signal indicative of component failure or change when the output AC signal exceeds a predetermined magnitude.

2. A device, as claimed in claim 1 wherein said signal processing means comprises:

rectifier means for converting the AC signal from said summing means to a corresponding DC voltage signal;

first comparator means for comparing the DC voltage signal to a predetermined first reference voltage and producing a first output signal when the DC voltage signal is equal to or exceeds the first reference voltage;

first timer means for timing the duration of the first output signal from said first comparator means and producing a first control signal when the duration exceeds a predetermined first time interval.

3. A device, as claimed in claim 2, further comprising:
first control means for disconnecting the polyphase equipment bank from the electrical power system in response to receipt of a control signal.

4. A device, as claimed in claim 2, further comprising:
second comparator means for comparing the DC voltage signal to a predetermined second reference voltage and producing an output signal when the DC voltage signal is equal to or exceeds the second reference voltage;

second timer means for timing the duration of the output signal from said second comparator means and producing a second control signal when the duration exceeds a predetermined second time interval;

second control means for providing a visual or audible alarm signal in response to receipt of a second control signal.

5. A device, as claimed in claim 2, further comprising:
third comparator means for comparing the DC voltage signal to a predetermined third reference voltage representative of a gross overvoltage unbalance of the polyphase equipment bank and producing an output signal directly to said first control means when said DC voltage signal is equal to or exceeds said third reference voltage so that said first control means will quickly disconnect the polyphase equipment bank from the electrical power system without awaiting operation of said first timer means.

6. A device, as claimed in claim 1, wherein said calibration means for compensating for manufacturing tolerance errors of the components of the polyphase system and unbalances in the electrical power system includes:

switch means for selectively and individually connecting each voltage signal from said voltage sensing means for each phase to said summing means and for dividing the output AC signal of the summing means by a preselected ratio;

means for individually adjusting the magnitude of the voltage signal from said voltage sensing means for each phase applied to said summing means so that the magnitude of the output AC signal of the summing means for each phase can be adjusted to be equal.

7. A device, as claimed in claim 1, wherein said summing means further comprises filter means for filtering out unwanted harmonics and noise from said output AC signal.

8. A device, as claimed in claim 2, further comprising:
meter means for providing visual indications of the magnitude of applied voltages; p1 means for applying said first reference voltage to said meter means; means for adjusting said first reference voltage.

9. A device, as claimed in claim 4, further comprising:
meter means for providing a visual indication of the magnitude of applied voltages;
means for applying said second reference voltage to said meter means;
means for adjusting said second reference voltage.

10. A device, as claimed in claim 1, further comprising means for proportionally adjusting the voltage signals from said voltage sensing means so that said voltage signals are of an amplitude when applied to said summing means to provide for optimal operation of the device.

11. A device, as claimed in claim 4, wherein said second control means includes power sensing means which causes an alarm signal to be produced when electrical power to the device is terminated.

12. A device, as claimed in claim 2, wherein said first timer means comprises:
RC delay means including a resistor-capacitor timing circuit for providing a first time delay;
counter means including at least one decade counter for providing a second time delay; said first and said second time delays comprising the first time interval.

13. A device, as claimed in claim 4, wherein said second timer mean comprises:
RC delay means including a resistor-capacitor timing circuit for providing a first time delay;
counter means including at least one decade counter for providing a second time delay, said first and said second time delays comprising the second time interval.

14. A device for detecting capacitor unit failures in a multi-phase grounded wye-connected capacitor bank in a high voltage electrical power system comprising:

a plurality of potential devices, one potential device for each phase of the power system being connected between ground and an intermediate tap point for each phase, said tap point located approximately an equal number of capacitors between ground and a transmission line for that phase of the power system, and said potential devices providing a voltage signal for each phase representative of the voltage at each tap point;

a summing amplifier connected with each potential device and vectorily adding the voltage signals for each phase and producing an AC signal representative of the summation of the voltage signals for all phases;

a rectifier means for converting the AC signal from said summing amplifier into a corresponding DC voltage signal;

a first voltage comparator receiving said DC voltage signal and comparing said DC voltage signal with a first predetermined reference voltage representative of the failure of a preselected number of capacitors and providing a first output signal when said DC voltage signal is equal to or exceeds the first reference voltage;

a first timing circuit that measures the time duration of said first output signal of said first voltage comparator and provides a first control signal when the duration of said first output signal exceeds a first predetermined time interval;

a lockout control circuit receiving said first control signal and causing the capacitor bank to be disconnected from the power system in response to receipt of said first control signal.

15. A device, as claimed in claim 14, further comprising:

a second voltage comparator receiving said DC voltage signal and comparing said DC voltage signal with a second predetermined reference voltage representative of the failure of a preselected number of capacitors and providing a second output signal when said DC voltage signal is equal to or exceeds the second reference voltage;

a second timing circuit that measures the time duration of said second output signal of said second voltage comparator and provides a second control signal when the duration of said second output signal exceeds a second predetermined time interval;

an alarm control circuit receiving said second control signal and producing an audible or visual alarm signal in response to receipt of said second control signal.

16. A device, as claimed in claim 14, further comprising:

a third voltage comparator receiving said DC voltage signal and comparing said DC voltage signal with a third reference voltage representative of a gross voltage unbalance resulting from a massive failure of capacitors, and producing an output signal directly to said lockout control circuit for causing said lockout control circuit to rapidly disconnect the capacitor bank from the power system.

17. A device, as claimed in claim 14, further comprising:

a volt meter for producing a visual indication of the magnitude the AC signal from said summing amplifier;

a switch connected to said potential devices for individually and selectively connecting said potential devices for each phase to said summing amplifier;

a plurality of variable resistors, one of said plurality of variable resistors respectively connected with each potential device for each phase so that the voltage signal for each phase can be adjusted before being applied to said summing amplifier to equalize each of said voltage signals for each phase to eliminate any error voltages resulting from manufacturing tolerance errors of the capacitors and any power system unbalance.

18. A device, as claimed in claim 14, further comprising a 60 Hz band pass filter connected with said summing amplifier for eliminating unwanted harmonics and noise from said AC signal.

19. A device, as claimed in claim 14, further comprising:

a volt meter for providing a visual indication of the magnitude of voltages applies thereto;

means for applying said first reference voltage to said volt meter;

means for adjusting said first reference voltage.

20. A device, as claimed in claim 15, further comprising:

a volt meter for providing a visual indication of voltages applied thereto;

means for applying said second reference voltage to said volt meter; and means for adjusting said second reference voltage.

21. A device, as claimed in claim 14, further comprising means for proportionally adjusting the voltage signals from said potential devices so that said voltage signals are of an amplitude when applied to said summing amplifier to provide for optional operation of the device.

22. A device, as claimed in claim 15, wherein said alarm control circuit includes power sensing means which causes an alarm signal to be produced when electrical power to the device is terminated.

23. A device, as claimed in claim 14, wherein said first timing circuit comprises:

a resistor-capacitor network in combination with a fourth voltage comparator that provides a first time delay before the first output signal of said first voltage comparator is transmitted;

a free running oscillator producing timing pulses;

at least one decade counter for receiving the transmitted first output signal and the timing pulses and providing a second time delay before transmitting the first control signal, said first and second time delays corresponding to the first time interval.

24. A device, as claimed in claim 15, wherein said second timing circuit comprises:

a resistor-capacitor network in combination with a fifth voltage comparator that provides a first time delay before the second output signal of said second voltage comparator is transmitted;

a freerunning oscillator producing timing pulses;

at least one decade counter for receiving the transmitted second output signal and providing a second time delay before transmitting the second control signal, said first and second time delays corresponding to the first time interval.

25. A device for detecting voltage unbalances in a grounded polyphase equipment bank, each phase leg of the bank being energized by a respective line of an electrical power system, the unbalances resulting from failure or inadvertent change of one or more components of the polyphase equipment bank comprising:

voltage sensing means for providing a voltage signal between an electrically similar point within each phase leg of the equipment bank and ground, the voltage at each such similar point being less than line voltage;

means for summing the voltage signals from each phase leg and creating an artificial neutral voltage as long as there is no failure or change of the components but providing an AC signal when the components fail or change representative of the voltage unbalance caused by the failure or change of components.

* * * * *

UNITED STATES PATENT AND TRADEMARK OFFICE
CERTIFICATE OF CORRECTION

PATENT NO. : 4,104,687
DATED : August 1, 1978
INVENTOR(S) : John A. Zulaski

It is certified that error appears in the above-identified patent and that said Letters Patent are hereby corrected as shown below:

Column 7, line 7, "managment" should read "management".

Column 12, line 16, "on" in the first instance should read "to".

Column 14, line 37, "mean" should read "means".

Column 16, line 2, "applies" should read "applied".

Signed and Sealed this

Twentieth Day of March 1979

[SEAL]

Attest:

RUTH C. MASON
*Attesting Officer*

DONALD W. BANNER
*Commissioner of Patents and Trademarks*